United States Patent [19]
Waligorski et al.

[11] Patent Number: 5,171,952
[45] Date of Patent: Dec. 15, 1992

[54] MICROWAVE KETTLE WITH REENTRANT BASE

[75] Inventors: Gordon J. Waligorski, Delphi; Kenneth P. Yungkans, Terre Haute, both of Ind.

[73] Assignee: General Housewares Corp., Stamford, Conn.

[21] Appl. No.: 770,889

[22] Filed: Oct. 4, 1991

[51] Int. Cl.⁵ .................................................. H05B 6/80
[52] U.S. Cl. ...................... 219/10.55 E; 219/10.55 F; 99/DIG. 14; 126/388
[58] Field of Search ................ 219/10.55 E, 10.55 F; 126/373, 374, 375, 388, 389; 99/DIG. 14, 344; 116/67 R, 108

[56] References Cited

U.S. PATENT DOCUMENTS

| | | | |
|---|---|---|---|
| D. 218,635 | 9/1970 | Lax | D44/25 |
| D. 237,570 | 11/1975 | Lax | D7/60 |
| D. 269,318 | 6/1983 | Blanchard | D7/312 |
| D. 274,595 | 7/1984 | Lebowitz | D7/322 |
| D. 311,839 | 11/1990 | Hutter, III et al. | D7/317 |
| 2,501,142 | 3/1950 | Reichart | 126/388 |
| 4,104,957 | 8/1978 | Freedman et al. | 219/10.55 E |
| 4,345,512 | 8/1982 | Moore | 99/323 |
| 4,381,696 | 5/1983 | Koral | 219/10.55 E |
| 4,385,585 | 5/1983 | Lebowitz | 126/388 |
| 4,416,907 | 11/1983 | Watkins | 426/234 |
| 4,577,080 | 3/1986 | Grossman | 219/10.55 E |
| 4,642,443 | 2/1987 | Jorgensen et al. | 219/10.55 E |
| 4,692,580 | 9/1987 | Bell | 219/10.55 M |
| 4,721,835 | 1/1988 | Welker | 219/10.55 E |
| 4,751,359 | 6/1988 | Jamieson | 219/10.55 M |
| 4,831,224 | 5/1989 | Keefer | 219/10.55 E |
| 4,900,886 | 2/1990 | Bridges | 219/10.55 E |
| 4,990,734 | 2/1991 | Hirsch | 219/10.55 E |
| 5,056,424 | 10/1991 | Lai | 126/373 |

*Primary Examiner*—Philip H. Leung
*Attorney, Agent, or Firm*—Emrich & Dithmar

[57] ABSTRACT

A microwave kettle includes a cover and base of microwave-transmissive material twist-locked and adhesively secured together to define a reservoir chamber. The base has a raised, central, reentrant portion which results in the reservoir chamber having an annular portion. A spout is unitary with the cover and is provided with a press-fitted whistle cap. A handle is heat-staked to the cover. A cylindrical support flange depends from the bottom of the base.

15 Claims, 1 Drawing Sheet

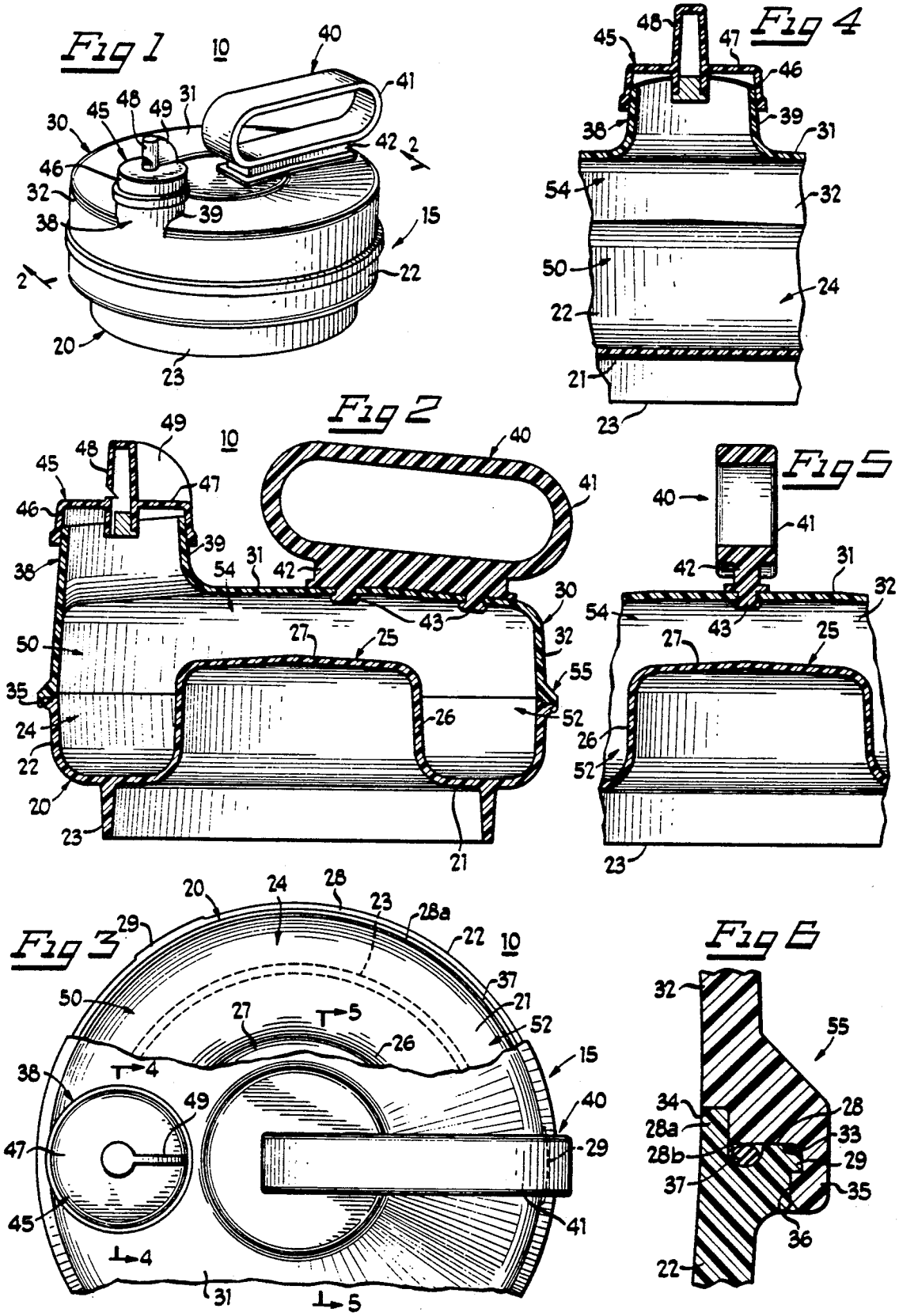

MICROWAVE KETTLE WITH REENTRANT BASE

BACKGROUND OF THE INVENTION

1. Field of the Invention

The present invention relates to cooking vessels of the type suitable for use in microwave ovens and, in particular, to microwave kettles, such as tea kettles.

2. Description of the Prior Art

Various types of cooking vessels have been designed for use in microwave ovens. These designs have been characterized by the use of specific microwave-transmissive materials, so that the microwave energy will be passed to the food product being cooked, with as little as possible of the microwave energy being absorbed by the vessel. These microwaveable vessels have included vessels for heating liquids. In particular, a number of different designs of microwaveable coffee makers are known which have provided specific structure for containing the coffee grounds and providing interface between the grounds and the water. Microwave tea kettles have also been provided, as have microwaveable vessels for holding tea leaves in tea kettles or other steeping vessels.

However, such tea kettles and microwaveable vessels for heating liquids have not been characterized by shapes designed to provide the most efficient transfer of microwave energy to the liquid being heated.

SUMMARY OF THE INVENTION

It is a general object of the present invention to provide an improved kettle for use in a microwave oven which avoids the disadvantages of prior kettles while affording additional structural and operating advantages.

An important feature of the invention is the provision of a kettle formed of a microwave-transmissive material, which has a unique shape designed to improve transfer of microwave energy to the liquid contained therein.

In connection with the foregoing feature, it is another feature of the invention to provide a kettle of the type set forth, which defines a reservoir chamber such that no point therein is more than a predetermined distance from the periphery thereof.

In connection with the foregoing features, a still further feature of the invention is the provision of a kettle of the type set forth wherein the reservoir chamber has an annular portion.

A still further feature of the invention is the provision of kettle of the type set forth which includes a cover and a base interconnected at a fluid-tight joint.

These and other features are attained by providing a kettle for use in a microwave oven comprising: microwave-transmissive wall structure defining a reservoir chamber, the wall structure having a reentrant portion which projects into the reservoir chamber, spout means on the wall structure communicating with the reservoir chamber, and handle means disposed on the wall structure.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a kettle constructed in accordance with and embodying the features of the present invention;

FIG. 2 is an enlarged view in vertical section taken along the line 2—2 in FIG. 1;

FIG. 3 is an enlarged, fragmentary, top plan view of the kettle of FIG. 1, with portions broken away more clearly to show the internal construction;

FIG. 4 is a fragmentary view in vertical section taken along the line 4—4 in FIG. 3;

FIG. 5 is a fragmentary view in vertical section taken along the line 5—5 in FIG. 3; and FIG. 6 is a further enlarged, fragmentary, sectional view of the joint between the base and cover of the kettle of FIG. 2.

DESCRIPTION OF THE PREFERRED EMBODIMENT

Referring to the drawing, there is illustrated a kettle, generally designated by the numeral 10, constructed in accordance with the present invention. The kettle 10 comprises a wall structure 15 which includes a base 20 and a cover 30, interconnected at a joint 55 to define a reservoir chamber 50 for containing water or other liquid to be heated.

The base 20 is of unitary, one-piece construction, and includes an annular bottom wall 21, the outer edge of which is jointed by a curved corner to an upstanding outer side wall 22 which is sloped slightly outwardly and upwardly so as to be generally frustoconical in shape. Integral with the bottom wall 21 intermediate the inner and outer edges thereof and depending therefrom coaxially therewith is a substantially cylindrical support flange 23. The base 20 includes a reentrant portion 25, which is substantially in the shape of an inverted bowl and includes an upstanding inner side wall 26 joined to the inner edge of the bottom wall 21 by a curved corner. The inner side wall 26 is integral at its upper edge with and closed by a circular end wall 27 which is disposed above the upper edge of the outer side wall 22. The bottom wall 21 and the side walls 22 and 26 cooperate to define an annular cavity 24 which encircles the reentrant portion 25. Referring in particular to FIGS. 2 and 6, the upper end of the outer side wall 22 is provided with an annular end surface 28 along its outer edge and an upstanding wall 28a along its inner edge, the end surface 28 being provided with a groove or channel 28b therein adjacent to the upstanding wall 28a around its entire circumference. Projecting radially outwardly from the side wall 22 at equiangularly spaced-apart locations thereon just below the end surface 28 are three circumferentially elongated locking flanges 29 (see also FIG. 3), each of which has a vertical thickness which is tapered from one end to the other thereof.

The cover 30 is also of unitary, one-piece construction and includes a generally circular top wall 31, which includes a flat, circular, central portion and a slightly downwardly and outwardly sloping peripheral portion. The top wall 31 is integral around its periphery with a depending side wall 32, which slopes slightly outwardly and downwardly so as to define a generally frustoconical shape. The side wall 32 is provided at its lower end with an annular end surface 33, having a recess 34 along its inner edge and a depending lip 35 along its outer edge which extends downwardly below the level of the end surface 33 (see FIG. 6). Projecting radially inwardly from the lip 35 at equiangularly spaced-apart locations thereon are three circumferentially elongated locking flanges 36, each having a vertical thickness which is tapered from one end to the other thereof.

In assembly of the kettle 10, a bead 37 of a suitable adhesive is deposited in the channel 28b, and the cover 30 is then fitted over the base 20, with the end surfaces 28 and 33 abutting each other, with the upstanding wall 28a being received in the recess 34 and with the end surface 33 in contact with the bead 37 of adhesive. The cover 30 is oriented so that the locking flanges 36 thereon respectively alternate with the locking flanges 29 on the base 20, with the thick ends of the cover flanges 37 adjacent to the thin ends of the base flanges 29, and vice versa. The base 20 and cover 30 are then rotated relative to each other about their common vertical axis, thereby sliding the locking flanges 29 and 36 into wedging engagement with each other. There is thus formed a rigid twist-lock joint 55 between the base 20 and the cover 30, with the adhesive 37 serving to provide a fluid-tight seal therebetween, as is illustrated in FIG. 6. However, it will be appreciated that other techniques could be used for joining together the base 20 and the cover 30.

The cover 30 also includes an upstanding spout 38 which has a generally cylindrical side wall 39 unitary with the top wall 31 and the side wall 32 and projecting upwardly from the cover 30 adjacent to the periphery thereof. Attached to the cover 30 at a position generally diametrically opposite the spout 38 is a handle 40 which includes a flattened loop 41 integral along its bottom with a base portion 42 shaped to rest snugly against the outer surface of the cover top wall 31. The base 42 has a pair of depending lugs 43 which extend through complementary openings in the cover top wall 31 and are fixedly secured thereto, as by heat staking.

A whistle cap 45 is provided for covering the open end of the spout 38. The cap 45 is preferably of unitary, onepiece construction and includes a generally cylindrical side wall 46 closed at its upper end by a circular end wall 47. The end wall 47 is integral, centrally thereof with a whistle 48 which projects upwardly and outwardly therefrom, and is stabilized by a gusset wall 49. Preferably, the spout side wall 39 and the cap side wall 46 are slightly tapered upwardly and radially inwardly so that the latter fits telescopically over the former in a wedging friction fit.

It will be appreciated that the base 20 and the cover 30 cooperate to define therebetween the reservoir chamber 50. It is a significant aspect of the present invention that the shape of the base 20 and the cover 30 are such that the reservoir chamber 50 has a unique configuration which includes an annular portion 52 which is generally toroidal in shape and communicates at its upper end with a generally flat upper portion 54 which, in turn, communicates with the spout 38. This configuration is such that no point in the chamber 50 is more than a predetermined distance from the wall structure 15. For consumer-type microwave ovens which generate microwave energy in the range of 500-700 watts, this predetermined distance is approximately one and one-quarter inches. For larger commercial ovens in the 1500-2000 watt range, the predetermined distance may be up to two inches.

This configuration has been found to produce significant advantages, since it has been determined that, in heating food loads, microwave energy penetrates only that predetermined distance into the food load from any point on the surface thereof. The microwave energy does not penetrate to the central region of standard kettle configurations when the kettle is full. Thus, water at the center of the kettle is not directly heated by microwave energy, but rather must be heated by convection from the water near the wall structure of the kettle, which is directly heated by the microwave energy. This tends to increase the time and energy required to heat a given volume of water to a predetermined temperature, thereby impairing heating efficiency. The present invention, on the other hand, optimizes heating efficiency, since liquid at any point in the reservoir chamber 50 will be directly heated by microwave energy, regardless of how full the kettle is. It will be appreciated that the dimensions of the kettle 10 may vary, depending on the capacity of the kettle, as long as the above-described predetermined distance is not exceeded. Even if the predetermined distance is exceeded, the kettle 10 will still provide improved results to the extent that the farthest point in the chamber 50 from the wall structure 15 is closer than in prior kettles.

The base 20 and the cover 30 may be formed of the same material, which is a microwave-transmissive material, i.e., a material which transmits at least 80% of the microwave energy incident thereon. In the preferred embodiment of the invention, this material is a glass-filled polyester, but it will be appreciated that other materials could be used. The high microwave transmissivity of the material not only maximizes the amount of energy which will pass into the liquid to be heated, but also minimizes the amount of energy absorbed by the handle 40, so that it will not become too hot for comfortable contact with the human hand. It will be appreciated that, in use, the reservoir chamber 50 is filled and emptied through the spout 38, and the whistle cap 45 functions in the usual manner. The depending flange 23 serves as a support base which provides thermal insulation between the kettle 10 and an underlying support surface, such as a table or the like. In this regard, it will be appreciated that the flange 23 defines an air gap between the support surface and the base 20 of the kettle 10 and presents a relatively small cross-sectional area for conduction of heat. In a constructional model of the invention the handle 40 and the whistle cap 45 are formed of a suitable microwave transmissive material, such as a polycarbonate.

From the foregoing, it can be seen that there has been provided an improved kettle for use in a microwave oven which is of simple and economical construction and which has a unique configuration and arrangement such as to optimize heating efficiency and facilitate assembly.

We claim:

1. A kettle for use in a microwave oven comprising: microwave-transmissive wall structure defining a reservoir chamber, said wall structure including a base having a bottom wall and a peripheral side wall and a cover overlying said base and secured thereto, said base having a reentrant portion in said bottom wall which project above said side wall and into said reservoir chamber to define an annular lower potion thereof, said cover cooperating with said base to define an upper portion of said reservoir chamber circular in transverse cross section and overlying and communicating with said annular portion, spout mean on said wall structure communicating with said reservoir chamber circular in transverse cross section and overlying and communicating with said annular portion, spout means on said wall structure communicating with said reservoir chamber, and handle means disposed on said wall structure.

2. The kettle of claim 1, wherein said spout means and said handle means are formed of the same material as said wall structure.

3. The kettle of claim 1, wherein said wall structure is formed of a glass-filled polyester material.

4. The kettle of claim 1, wherein said handle means and said spout means are disposed at spaced-apart locations on the top of said wall structure.

5. The kettle of claim 1, wherein said reentrant portion is disposed centrality of said bottom wall.

6. The kettle of claim 5, wherein said reentrant portion is substantially in the shape of an inverted bowl.

7. The kettle of claim and further comprising support means depending from said wall structure at the bottom thereof.

8. The kettle of claim 7, wherein said support means includes a substantially cylindrical wall.

9. The kettle of claim 8, wherein said cylindrical wall is unitary with aid reservoir.

10. The kettle of claim 1, wherein said annular portion of said reservoir is generally toroidal in shape.

11. The kettle of claim 1, and further comprising a whistle cap disposable on said spout means for closing same.

12. The kettle of claim 11, wherein said whistle cap is adapted for telescopically receiving said spout means therein in press-fitted engagement therewith.

13. The kettle of claim 1, and further comprising means interconnecting said cover and said base at a fluid-tight joint in an assembled condition.

14. The kettle of claim 13, wherein aid means interconnecting includes means on said cover and on said base providing twist-lock engagement herebetween, and adhesive means disposed between said cover and said base for fixedly interconnecting them in fluid-tight relationship.

15. The kettle of claim 1, wherein said spout means is unitary with said over.

* * * * *

UNITED STATES PATENT AND TRADEMARK OFFICE
CERTIFICATE OF CORRECTION

PATENT NO. : 5,171,952
DATED : December 15, 1992
INVENTOR(S) : Gordon J. Waligorski and Kenneth P. Yungkans It is certified that error appears in the above-identified patent and that said Letters Patent is hereby corrected as shown below:

```
Column 4, line 62, after "microwave-transmissive" insert
                   --external--;
          line 66, "project" should be --projects--;
Column 5, line 4, "mean" should be --means--;
          line 5, "circular in transverse cross section and
                   overlying and communicating with said
                   annular portion, spout means on said wall
                   structure communicating with said reservoir
                   chamber " should be deleted;
          line 22, after "claim" insert --1--;
Column 6, line 4, "aid" should be --said--;
          line 16, "aid" should be --said--;
          line 18, "herebetween" should be --therebetween--; and
          line 23, "over" should be --cover--.
```

Signed and Sealed this

Nineteenth Day of October, 1993

Attest:

BRUCE LEHMAN

*Attesting Officer*  *Commissioner of Patents and Trademarks*